United States Patent [19]

Duranton et al.

[11] Patent Number: 5,293,459
[45] Date of Patent: Mar. 8, 1994

[54] NEURAL INTEGRATED CIRCUIT COMPRISING LEARNING MEANS

[75] Inventors: Marc A. G. Duranton, Boissy Saint Leger; Jacques A. Sirat, Limeil-Brevannes, both of

[73] Assignee: U.S. Philips Corporation, New York, N.Y.

[21] Appl. No.: 793,482

[22] Filed: Oct. 23, 1991

Related U.S. Application Data

[63] Continuation of Ser. No. 452,858, Dec. 18, 1989, abandoned.

[30] Foreign Application Priority Data

Dec. 23, 1988 [FR] France .................. 8817109

[51] Int. Cl.$^5$ .............................................. G06F 15/18
[52] U.S. Cl. ..................................................... 395/27
[58] Field of Search ....................................... 395/24, 27

[56] References Cited

U.S. PATENT DOCUMENTS

| | | | |
|---|---|---|---|
| 3,165,644 | 1/1965 | Clapper | 364/513 |
| 3,638,196 | 1/1979 | Nishiyama et al. | 395/24 |
| 3,701,974 | 10/1972 | Russell | 364/513 |
| 4,802,103 | 1/1989 | Faggin et al. | 364/24 |
| 4,805,129 | 2/1989 | David | 395/24 |
| 4,807,168 | 2/1989 | Moopenn et al. | 364/513 |
| 4,866,645 | 9/1990 | Lish | 307/201 |
| 4,874,963 | 10/1989 | Alspector | 377/2 |
| 4,885,757 | 12/1989 | Provence | 364/807 |
| 4,897,811 | 1/1990 | Scofield | 364/513 |
| 4,904,881 | 2/1990 | Castro | 364/807 |
| 4,912,651 | 3/1990 | Wood et al. | 364/513 |
| 4,947,482 | 8/1990 | Brown | 364/513 |
| 4,951,239 | 8/1990 | Andes et al. | 307/201 |
| 4,974,169 | 11/1990 | Engel | 395/24 |
| 5,005,206 | 4/1991 | Naillon et al. | 382/15 |
| 5,107,454 | 4/1992 | Niki | 395/24 |

OTHER PUBLICATIONS

Krauth et al, "Learning algorithms with optimal stability in neural networks" J. Phys. A:Math Genzo (1987).

Duranton et al, "A general Purpose Digital Architecture for Neural Network. Simulations", 1st IEEE Int. Conf. on Artificial Neural Network, Oct. 1989, pp. 62–66.

Pacheco et al, "A Simple VLSI Architecture for Neuro computing," Neural Networks vol. 1, 1988.

Paulos et al, "VLSI Architecture for Feedforward Networks with Integral Back-propagation" Neural Network No. 1 Sep. 1, 1988.

Communication from INPI in French Application 88-17109, a corresponding application.

Primary Examiner—Allen R. MacDonald
Assistant Examiner—George Davis
Attorney, Agent, or Firm—David Schreiber

[57] ABSTRACT

A neural integrated circuit, comprising a synaptic coefficient memory, a neuron state memory, resolving means and learning means which simultaneously operate in parallel on each of the synaptic coefficients in order to determine new synaptic coefficients. The learning means comprise means for performing a learning function on the states Vj of input neurons and on a correction element Si which is associated with each output neuron, and also comprise incrementation/decrementation elements which determine the new synaptic coefficients in parallel. The learning functions may be formed by logic AND-gates and exclusive-OR gates. The integrated circuit is used in a neural network system comprising a processing device.

18 Claims, 2 Drawing Sheets

NEURAL INTEGRATED CIRCUIT COMPRISING LEARNING MEANS

This is a continuation of application Ser. No. 07/452,858, filed Dec. 18, 1989, now abandoned.

BACKGROUND OF THE INVENTION

The invention relates to a neural integrated circuit, comprising:
a memory M for synaptic coefficients Cij
a memory for neuron states
resolving means for determining states of output neurons I on the basis of states of input neurons j,
learning means for determining new synaptic coefficients Cij by performing local learning steps.

The invention also relates to a neural network system comprising a processing device for cooperation with such a neural circuit.

A circuit of this kind is known from the document "A fully digital CMOS integrated feedback network including the learning process", M. Weinfeld, G. Dreyfus, A. Johannet, L. Personnaz, Neural Networks for computing, Snowbird, Utah, Apr. 6-9, 1988.

The cited document concerns an integrated circuit which executes resolving steps and learning steps on the basis of the Widrow-Hoff learning rule. In this circuit parallelism exists as regards the states of output neurons i. The circuit also has a mechanism for the circulation of data which is applied to the index i of the states of input neurons j. It follows therefrom that a particular treatment cannot be isolated to a given neuron. Thus, this circuit can operate with a limited number of learning rules only.

The problem faced by the invention is to realize a neural integrated circuit which is suitable for use in a neural network system comprising a processing device, is capable of operating at high speeds for simultaneously updating all synaptic coefficients of a given output neuron i, and is also capable of executing the bulk of the learning rules so that it can be used for solving the multitude of problems to be dealt with by neural network systems.

SUMMARY OF THE INVENTION

The solution to this problem consists in that for a given output neuron i the learning means simultaneously operate in parallel on each of the associated synaptic coefficients which are stored in the memory and which characterize the synapses which link the input neurons i converging towards an output neuron i; to this end, the learning means comprise:

means for imposing a learning function on parameters which are formed by the states Vj of neurons and by a modification parameter Si which is associated with each output neuron i in order to determine whether a modification is to be applied to each synaptic coefficient and to determine also the sign of this modification, and incrementation/decrementation elements which determine in parallel the new synaptic coefficients Cij on the basis of the sign of the modifications and of a correction value Δi which is associated with the relevant output neuron i and which is common to all input neurons j which converge towards the relevant output neuron, where Δi is a correction value which relates either to the state of the input neurons i or to the state of the output neuron i or to a function which combines these two types of state and which is determined either by the circuit itself or is supplied from outside the circuit, for instance by an external processing device, and where Si represents either the state of an input neuron j or the state of the given output neuron i, or states which are functions of these two types of state and which are supplied from outside the circuit, for instance by the processing device.

During the "resolving" step, the neural circuit selects all synaptic coefficients Cii of a given output neuron i in the memory M, multiplies these coefficients by the states Vj of the input neurons j and forms the sum of all these products so that:

$$\sum_{j=1}^{N} Cij \cdot Vj$$

where N is the total number of input neurons influencing the output neuron i.

The synaptic coefficients Cij are output in parallel by the memory M and reach an incrementation/decrementation element whose output signal is applied to a calculation member which is formed, for example by multipliers and an adder tree. The output result of the circuit is applied to the processing device which performs a non-linear function on this result. This non-linear function may also be applied to the result by the calculation member itself, before it is applied to the processing device. The states of input neurons i to be treated may be supplied either by the processing device or by the environment. During the "learning" step, the incrementation/decrementation elements receive control signals so as to perform either an incrementation or a decrementation on the relevant synaptic coefficient or to leave it unmodified. These control signals originate from central signal operator means for performing the learning function by supplying each incrementation/decrementation element with a two-bit signal for encoding the preceding commands.

The learning functions take into account the states Vj of the input neurons j and a modification parameter Si which is associated with each output neuron i. The means for performing the learning function are formed by learning elements, the number of learning elements being equal to the number of incrementation/decrementation elements and hence to the number of synaptic coefficients Cij to be simultaneously treated. Each of these learning elements receives a state Vj and the modification parameter Si which may both be encoded on one or more bits. These learning elements may be formed either by logic AND-gates or exclusive-OR logic gates, or by a combination of gates performing a complex function. They may also be formed by multiple-input multiplexers which select either the logic value 1 or the logic value 0 or at least one bit of the neuron state Vj of the modification parameter Si, or their complement.

The incrementation/decrementation elements receive these control signals as well as a correction value Δi which is common to all elements and which is specific of the output neuron i treated at a given instant. Thus, each incrementation element independently increments the synaptic coefficient by a value Δi or decrements it by a value Δi or leaves it unmodified. This correction value Δi may be applied to the circuit by an external processing device. However, it may also be determined by the circuit itself in a correction circuit. This correction value Δi is preferably an integer in order to impart the required precision to the synaptic coefficient.

The incrementation/decrementation operations can be performed on several consecutive cycles in order to enable operation with neuron states encoded on several bits. Actually, each learning element can receive states Vj and a modification parameter Si encoded on several bits. By performing several consecutive cycles it is also possible to perform multiplication operations Vj.Si with an adequate choice of the values $\Delta i$ supplied during each cycle. A selection member can impart to the modification parameter Si either the state of an input neuron i or the state of the given output neuron i or states which are a function of these two types of state and which are supplied for instance by an external processing device.

Each of the incrementation/decrementation elements may also have a storage function in order to free the synaptic coefficient memory for other tasks.

By way of example the invention will be described in detail hereinafter with reference to the accompanying drawing; therein:

DESCRIPTION OF THE PREFERRED EMBODIMENT

Figure 1:
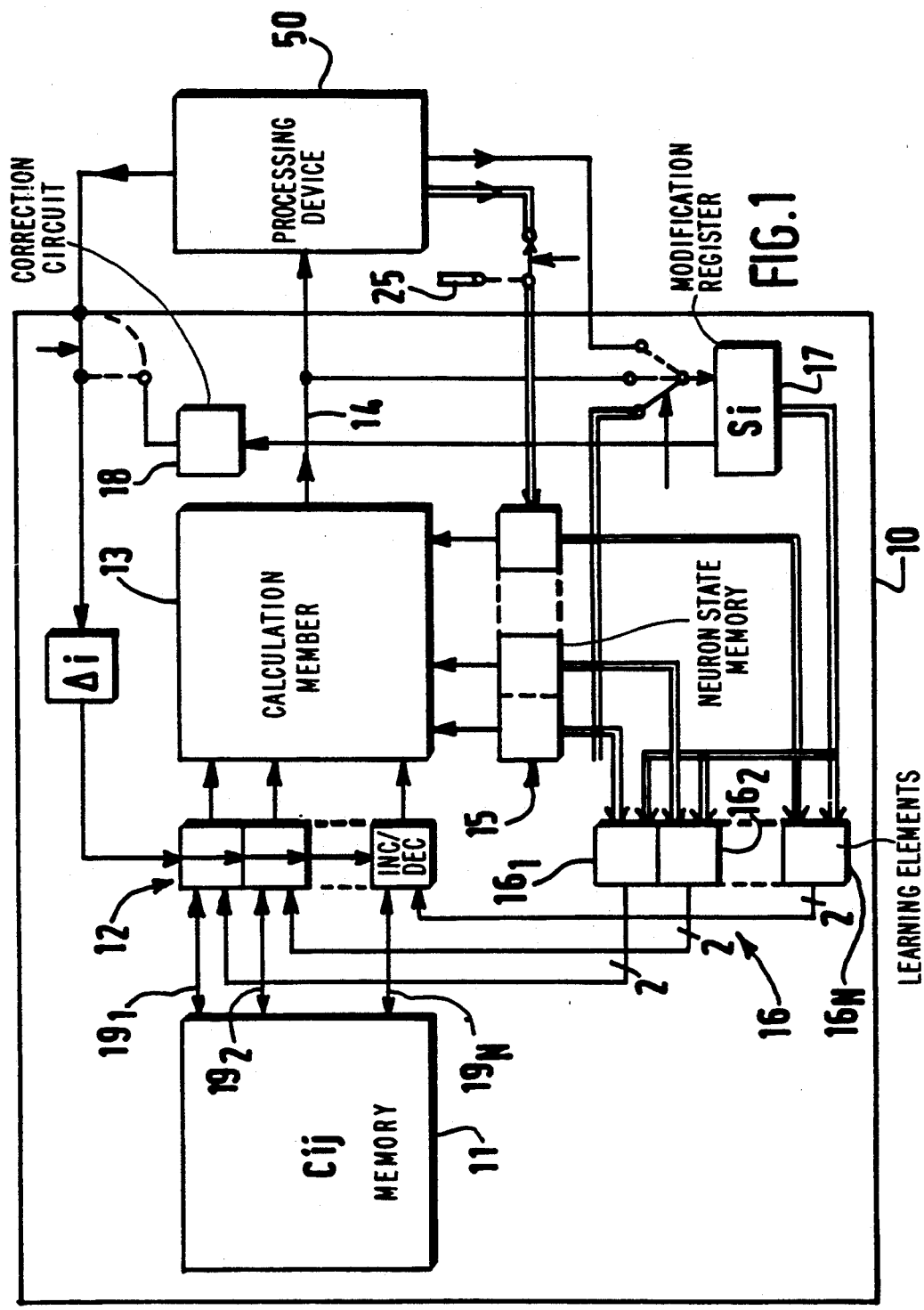
FIG. 1 shows a diagram of the neural circuit in accordance with the invention.

The neural circuit which preferably comprises an integrated circuit 10 is connected to a processing device 50 in order to form a neural network system or neural net. Normally a second and further integrated neural circuit is also connected to form the neural net. The second and any further integrated neural circuits preferably contain the same elements as circuit 10. The memory 11 for synaptic coefficients Cij outputs in parallel the synaptic coefficients Cij (bus $19_1$ to $19_N$) concerning a same given output neuron i. The synaptic coefficients reach incrementation/decrementation elements 12 which apply their coefficients to a calculation member 13. This member comprises, for example multipliers for performing the multiplications cij.vj and an adder tree for forming the sum of all multiplications. The result appears on the connection 14 for supply to the processing device 50 which performs a non-linear function on this result. This function may also be applied in the calculation member 13 itself.

The states Vj of input neurons j are stored in a neuron state memory 15 which receives these states from the processing device 50 or from the environment (connection 25) and which supplies these states to the calculation member 13. The neuron state memory 15 can receive correction states from the processing device 50 during the learning step. The control sign at generator means 16 for performing learning functions are formed by learning elements $16_1, 16_2, \ldots 16_N$ when there are N input neurons i to be treated. Each learning element receives a state Vi and the correction element Si supplied by a correction register 17. Each learning element supplies a two-bit data to each incrementation/decrementation element so that the latter elements perform either an incrementation or a decrementation or no operation at all. The modification register 17 stores the modification parameter Si which may have several origins. It may be either one of the states Vi of the input neurons i or a state Vi of the output neurons i or a function of these two types of state originating from the processing device 50. This selection is made through a selection member that connects either an output of processing device 50, or an output of calculation member 13, or an output of input neuron state memory 15 to modification register 17.

All incrementation/decrementation elements 12 also receive the same correction value hi which is used for modifying (or not) the old values Cii in order to determine new values Cii in accordance with the expression:

$$C_{ij}(\text{new}) = C_{ij}(\text{old}) + \Delta i \cdot F(S_i, V_j)$$

This correction value $\Delta i$ may originate either from the processing device 50 or from a correction circuit 18 which imposes a correction function G on the modification parameter Si.

Figure 2:
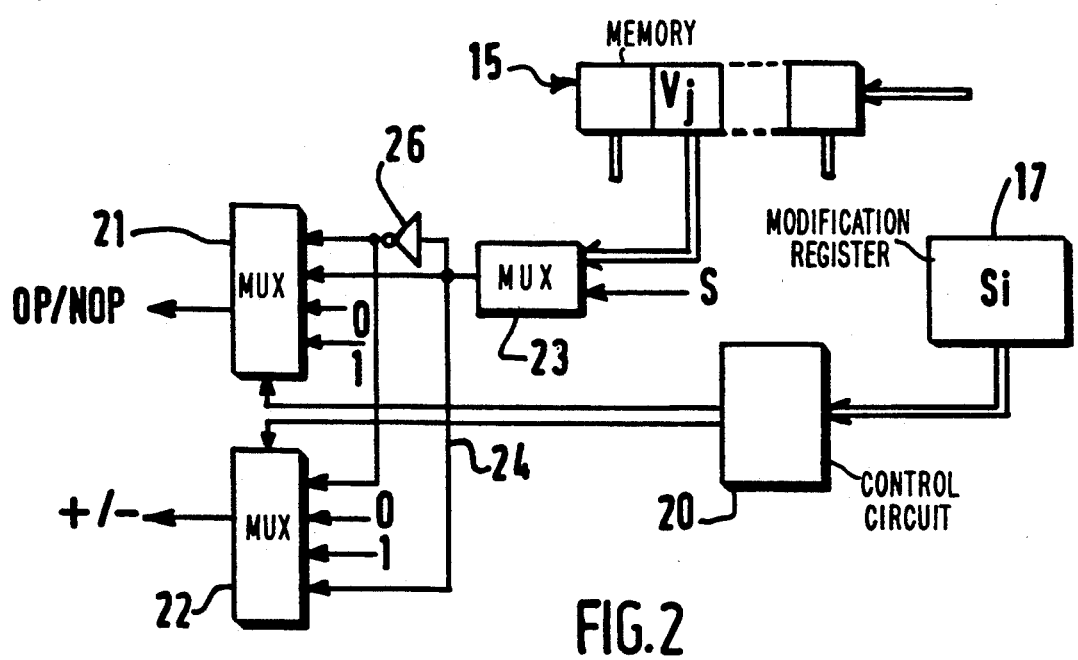
FIG. 2 shows a diagram of another method of realizing learning functions.

The learning elements $16_1 \ldots 16_N$ are formed, for example either by logic AND-gates or exclusive-OR gates or a combination of gates performing a complex function. As is shown in FIG. 2, it is also possible to perform the learning function itself by a common circuit which supplies common commands to multiplexers which treat each of the states Vj of the input neurons. In this case the various learning elements $16_1 \ldots 16_N$ share a circuit 20.

For example, the learning element $16_1$ of FIG. 1 is formed by multiplexers 21, 22 and 23 in FIG. 2. The multiplexer 23 reads a bit of the state $V_1$ in the memory 15. It successively delivers all bits of $V_1$ under the control of the command S. If $V_1$ is encoded on one bit, the multiplexer 23 is absent. The multiplexers 21 and 22 receive the state $V_1$ one bit after the other (connection 24). They are capable of selecting either the logic state 1 or the logic state zero or the state $V_1$ or the complementary state of $V_1$ (inverter 26). The multiplexers 21 and 22 are controlled by the circuit 20 which executes the selected learning function, for example AND-functions, exclusive-OR functions or complex functions. The circuit 20 is formed, for example, by a programmed logic array (PLA) or a RAM. The multiplexers 22 and 21 have distinct control signals and output the signals $\pm$, respectively, for incrementing/decrementing and also the signals OP/NOP for determining whether the operation is to be performed or not.

The incrementation/decrementation elements may comprise means for avoiding overflow during the operations. For example, in the case of overflow the synaptic coefficient may assume either the maximum value or the minimum value permitted by the circuit.

The incrementation/decrementation elements may be arranged in parallel in order to operate on synaptic coefficients encoded on an accrued number of bits. To this end, each incrementation/decrementation element comprises an input for an input carry and an output for an output carry, enabling either reconfiguration of the circuit or the cascading of several circuits in order to extend the processing possibilities to an accrued number of neurons.

For example, a learning algorithm which can be carried out by the circuit in accordance with the invention is referred to as "the minimum recovery of prototypes" (on this subject, see W. Krauth and M. Mezard, J. Phys. A 20 (1987), L 745–L 752). The object is to realize an associative memory for which the network associates on its output the prototype presented to its input. This can be applied for the correction of errors. Learning is iterative and progresses independently along the output neurons i.

For a given output neuron i, a prototype $$\epsilon_j^\mu$$

is presented (where $\mu$ is the index of the prototype and j is that of the neuron) to the input of the circuit which then operates in the resolving mode.

The circuit calculates:

$$h_i^\mu = \Sigma_j Cij \cdot \epsilon_j^\mu$$

When all prototypes have been presented, the prototype having the index $\nu$ is chosen so that $$h_i^\nu$$

is smaller than $$h_i^\mu$$

for all $\mu \neq \nu$.

The circuit then operates in the learning mode while modifying the synaptic coefficients relating to the output neuron i in accordance with the expression:

$$Cij(\text{new}) = Cij(\text{old}) + \epsilon_i^\nu \cdot \epsilon_j^\nu.$$

The modification parameter is thus given by:

$$F(Si, Vj) = \epsilon_j^\nu$$

and the increment is given by:

$$\Delta i = \epsilon_i^\nu.$$

This procedure is interated until the sums $$h_i^\mu$$

all exceed a criterion Z for all prototypes p and all output neurons i.

It is to be noted that this algorithm has an optimum effect for this type of network.

We claim:

1. A neural net comprising at least one integrated neural circuit, each neural circuit including:
   i) a memory for storing synaptic coefficient values and for in parallel providing the synaptic coefficient values at a memory output;
   ii) calculating means being coupled to the memory, and having an input for receiving input neuron values and an output for outputting an output neuron value, the output neuron value being generated by creating products by multiplying each of the input neuron values by a corresponding synaptic coefficient value and then summing the products;
   iii) a control signal generator receiving the input neuron values for generating a plurality of control signals, each control signal depending on one of the input neurons values;
   iv) modifying means being connected to the control signal generator and coupled to the memory output for receiving the synaptic coefficient values and performing in parallel operations on the synaptic coefficient values in response to the control signals each one of the control signals determining the operation to be performed, either creating a modified version of one of the coefficient values, or leaving the coefficient values unchanged, and for storing the modified version in the memory.

2. The neural net of claim 1 wherein the modifying means comprises:
   a plurality of increment/decrement elements, each one of the increment/decrement elements having:
   i) a first operand input connected to the memory output for recording one of a synaptic coefficient value;
   ii) a second operand input for receiving a correction value common to the plurality of increment/decrement elements;
   (iii) a control input for receiving one of the control signals;
   each one of the increment/decrement elements performing either one of the following operations depending on the control signals;
   (a) incrementing the synaptic coefficient values by the correction value;
   (b) decrementing the synaptic coefficient values by the correction value;
   (c) leaving synaptic coefficient values unchanged.

3. The neural net of claim 2 comprising at least a second integrated circuit that is similar to the first integrated circuit, wherein
   i) the modifying means of the first integrated circuit comprises a carry input for receiving an input carry;
   ii) the modifying means of the second integrated circuit comprises a carry output for providing an output carry; and
   iii) the carry input is connected to the carry output; for operating on the synaptic coefficient values, each whereof has a first number of bits stored in the memory of the first integrated circuit and a second number of bits stored in the memory of the second integrated circuit.

4. The neural net of claim 1 wherein the control signal generator comprises:
   learning function means for receiving the input neuron values and for subsequently applying a learning function to each one of the input neuron values in order to create the control signals.

5. The neural net of claim 4 wherein the control signal generator has a modification input for receiving a modification parameter value for controlling the learning function depending on the modification parameter value.

6. The neural net of claim 5 wherein the learning function means comprises:
   a plurality of uniform learning elements, each one of the learning elements for receiving one of the input neuron states and for receiving the modification parameter value and for supplying one of the control signals.

7. The neural net of claim 6 wherein each one of the learning elements performs a logic operation on one of the input neuron states and the modification parameter value, the logic operation including one of the following operations: an AND operation, an exclusive-OR operation.

8. The neural net of claim 5 wherein the learning function means comprises:

i) a first multiplexer having a first multiplexer output coupled to the modification means for supplying a first part of the one of the control signals for indicating whether or not one of the synaptic coefficient values is to be modified;

ii) a second multiplexer having a second multiplexer output coupled to the modification means for supplying a second part of one of the control signals for indicating whether one of the synaptic coefficient values is to be incremented or decremented by the correction value; and iii) multiplexer control means receiving the modification parameter value for controlling the first and second multiplexers by supplying first and second multiplexer control signals to a first multiplexer control input and a second multiplexer control input, respectively;

the first multiplexer and the second multiplexer each having:

(a) a first input for receiving a first logic value;
(b) a second input for receiving a second logic value that is the logic complement of the first logic value;
(c) a third input for receiving a particular one of a plurality of bits that represent one of the neuron input values;
(d) a fourth input for receiving the logic complement of the particular one of the plurality of bits.

9. The neural net of claim 8 wherein the multiplexer control means comprises a control memory having an input for receiving the modification parameter value and having first and second control outputs for providing the first and second multiplexer control signals, respectively, in response to the modification parameter value.

10. An integrated circuit including:

i) a memory for storing first values and for in parallel providing the first value at a memory output;

ii) calculation means being coupled to the memory, and having an input for receiving input values and an output for outputting an output value, the output value being generated by creating first products by multiplying each one of the input values by one of the first values and then summing the first products;

iii) a control signal generator receiving the input values for generating control signals, each one of the control signals depending on one of the input values;

iv) modifying means connected to the control signal generator and to the memory output for receiving the first values and performing in parallel operations on the first values in response to the control signals, each one of the control signals determining the operation to be performed, either creating a modified version of the first values, or leaving the first values unchanged, and for storing the modified version of the first value memory.

11. The integrated circuit of claim 10 wherein the modifying means comprises:

a plurality of increment/decrement elements, each one of the increment/decrement elements having:

i) a first operand input connected to the memory output for receiving one of the first values;

ii) a second operand input for receiving a correction value common to the plurality of increment/decrement elements;

iii) a control input for receiving one of the control signals;

each one of the increment/decrement elements performing either one of the following operations depending on the control signals;

(a) incrementing the first values by the correction value;
(b) decrementing the first values by the correction value;
(c) leaving the first values unchanged.

12. The integrated circuit of claim 11 wherein the modifying means comprises a carry input for receiving an input carry and a carry output for providing an output carry, in order to function as a part of a parallel arrangement of similar integrated circuits for modifying in parallel first values encoded on a number of bits that requires at least the first memory and an additional memory operating in parallel.

13. The integrated circuit of claim 10 wherein the control signal generator comprises:

learning function means for receiving the input values and for subsequently applying a learning function to each one of the input values in order to create one of the control signals.

14. The neural net of claim 13 wherein the control signal generator has a modification input for receiving a modification parameter value for controlling the learning function depending on the modification parameter value.

15. The neural net of claim 14 wherein the learning function means comprises:

a plurality of uniform learning elements, each one of the learning elements for receiving one of the input values and for receiving the modification parameter value parameter and for supplying one of the control signals.

16. The integrated circuit of claim 15 wherein each one of the learning elements performs a logic operation on one of the input values and the modification parameter value, the logic operation including one of the following operations: an AND operation, an exclusive-OR operation.

17. The integrated circuit of claim 14 wherein the learning function means comprises:

i) a first multiplexer having a first multiplexer output coupled to the modification means for supplying a first part of one of the control signals for indicating whether one of the control signals for indicating whether or not one of the first values is to be modified;

ii) a second multiplexer having a second multiplexer output coupled to the modification means for supplying a second part of one of the control signals for indicating whether one of the first values is to be incremented or decremented by the correction value; and iii) multiplexer control means receiving the modification parameter value for controlling the first and second multiplexers by supplying first and second multiplexer control signals to a first multiplexer control input and a second multiplexer control input, respectively;

the first multiplexer and the second multiplexer each having:

(a) a first input for receiving a first logic value;
(b) a second input for receiving a second logic value that is the logic complement of the first logic value;
(c) a third input for receiving a particular one of a plurality of bits that represent one of the input values; and (d) a fourth input for receiving the logic complement of the particular one of the plurality of bits.

18. The integrated circuit of claim 17 wherein the multiplexer control means comprises a control memory having an input for receiving the modification parameter value and having first and second control outputs for providing the first and second multiplexer control signals in response to the modification parameter value.

* * * * *